US006260917B1

(12) United States Patent
Marechal

(10) Patent No.: US 6,260,917 B1
(45) Date of Patent: Jul. 17, 2001

(54) DISMOUNTABLE ARTICULATION DEVICE, SEAT STRUCTURE, SEAT AND VEHICLE EQUIPPED WITH THIS DEVICE

(75) Inventor: Robert Marechal, Paris (FR)

(73) Assignee: Societ Industrielle et Commerciale de Materiel Aeronautique, Issoudun (FR)

( * ) Notice: Subject to any disclaimer, the term of this patent is extended or adjusted under 35 U.S.C. 154(b) by 0 days.

(21) Appl. No.: 09/240,727

(22) Filed: Jan. 29, 1999

(30) Foreign Application Priority Data

Jan. 30, 1998 (FR) .................................................. 98 01075

(51) Int. Cl.[7] ...................................................... A47B 83/02
(52) U.S. Cl. ............................................ 297/163; 297/169
(58) Field of Search .................................... 297/163, 167, 297/173, 169

(56) References Cited

U.S. PATENT DOCUMENTS

| | | |
|---|---|---|
| 2,389,897 | 11/1945 | Davis . |
| 3,439,880 | 4/1969 | Karlsen . |
| 3,910,632 | 10/1975 | Marechal . |
| 4,141,586 | 2/1979 | Goldner et al. . |
| 4,363,604 * | 12/1982 | Brunelle ........................... 297/163 X |
| 4,431,231 | 2/1984 | Elazari et al. . |
| 4,474,406 | 10/1984 | Wall et al. . |
| 4,511,178 * | 4/1985 | Brennan ........................... 297/167 X |
| 5,522,666 | 6/1996 | Tanaka . |

FOREIGN PATENT DOCUMENTS

| | | |
|---|---|---|
| 0 112 170 | 6/1984 | (EP) . |
| 2 278 983 | 2/1976 | (FR) . |
| 2 543 623 | 10/1984 | (FR) . |
| 879 109 | 10/1961 | (GB) . |

* cited by examiner

*Primary Examiner*—Anthony D. Barfield
(74) *Attorney, Agent, or Firm*—Nawrocki, Rooney & Sivertson, P.A.

(57) ABSTRACT

Apparatus for a swiveling a tray mounted in the back of an aircraft seat. The apparatus has a tube oriented transverse to the seat back around which the tray swivels. A tray is pivotably attached to the tube. A pair of bushes protrude outward from each end os the tube. Each bush ends in a generally mushroom shaped protrusion which is set off by an adjacent undercut defining a stressing and guiding zone. An elastic spring contained within a housing is mounted on the aircraft. The mounted spring has upward directed Y-shaped openings sized to receive and engage the protrusion at the backlash elimination zone and engage the protrusions and the tube. This spring grips and hold the protrusions which secures the tube. This arrangement permits the tube and its attached tray to be quickly and easily attached or removed from the seat. A transmission element in the form of an extending arm is also pivotably attached to the tube. The transmission element is coupled to the tray to urge the tray to rotate with respect to the seat back.

31 Claims, 6 Drawing Sheets

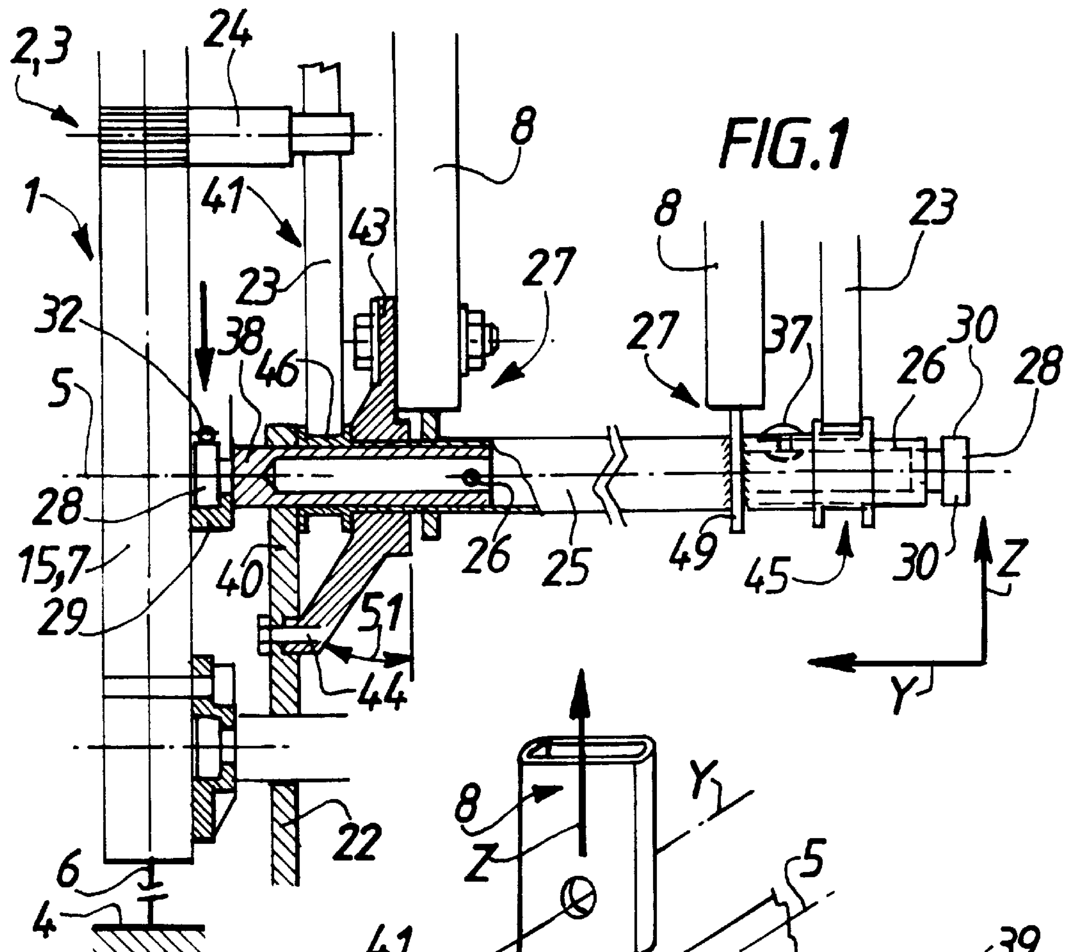
FIG.1
FIG.2
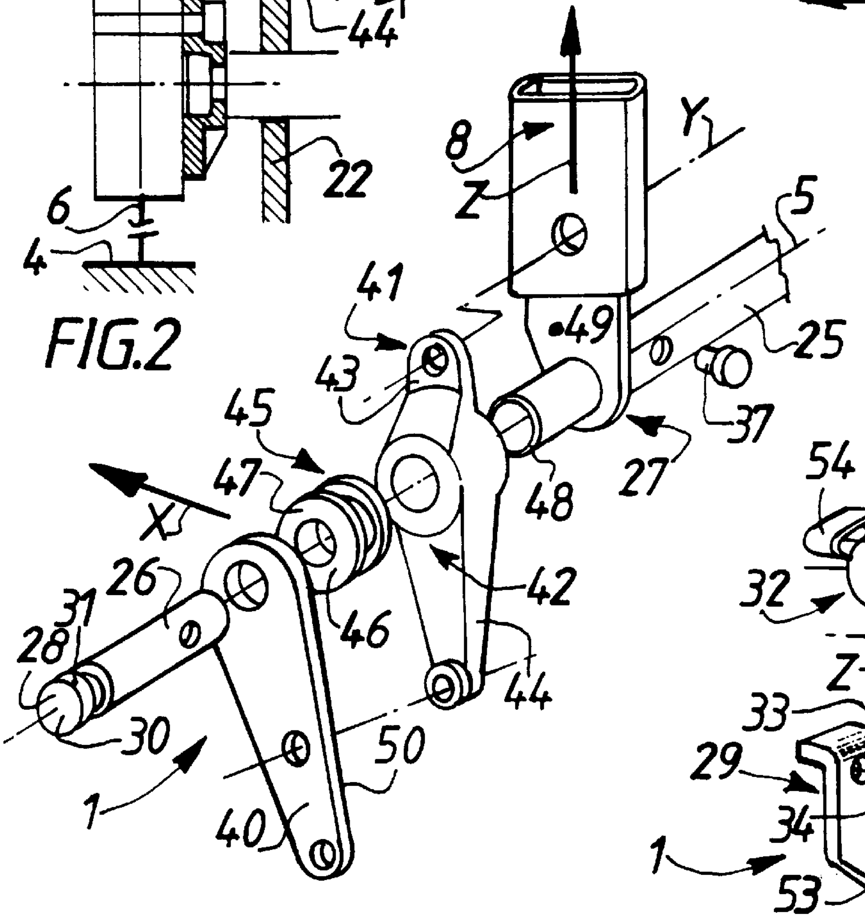
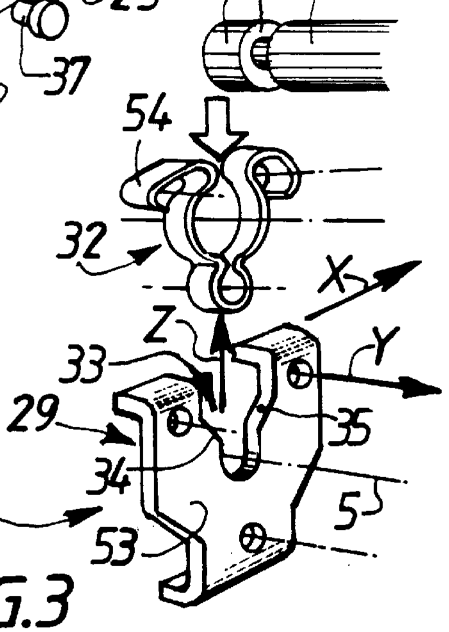
FIG.3

DISMOUNTABLE ARTICULATION DEVICE, SEAT STRUCTURE, SEAT AND VEHICLE EQUIPPED WITH THIS DEVICE

The invention relates to an articulation device for a vehicle seat as well as a seat structure, a seat and a vehicle, notably an aircraft, equipped with such an articulation device.

Therefore the general technical field of the invention is the fitting-out of the passenger vehicles, and more especially that of the seats with adjustable backs in public transportation air vehicles.

The articulation device mentioned here is integrated with the seat structure and intended to allow:

- tipping a seat back backward/forward with respect to its base;
- assembling/disassembling of the back with respect to the remaining seat structure
- swivelling when operating/retracting a tray, also called pull-out flat, at the back of the seat as the case may be
- easy assembling/disassembling of this tray; and
- not having any uncomfortable situation linked to the back tipping over when the tray is in operating position.

Various techniques are known in this field.

Document US-A-2 016 133 describes a seat of land vehicle, whose back inclination is adjustable according to various angles. A control is mounted in the arm rest to adjust the back angle.

Document US-A63 588 172 describes an adjustable seat with a tray mounted on the seat back upper part by two fixed pivots. This part is inclined forward when the back is lifted up or aligned with the back lower part when it is inclined.

Document NL-A-74 100 25 describes an articulation for swivelling a pull-out flat with a plastic bearing fastened on the rear part of a seat back. One rectangular piece of articulation is fitted with blocks to cooperate with the edge and tongue of the tray. The swivelling edge has two protuberant parts and a chamfer coaxial to an horizontal hub. One protuberant part is used as a stop and the other, which is hollow omega-shaped, is used for elastic hooking.

Document US-A-4 364 604 describes an aircraft seat with a pair of pivots, a pair of mounting legs with openings, and a pair of side frames. Each of the latter comprises a boss with a hooking surface and an opening to house a block. A dismountable tray, independent of the back and conversely, is fitted with fork-shaped hooking lugs and swings round the back axis.

Document US-A-4 431 231 also describes a reclining aircraft seat, with a retractable tray or flat. Blocking means are provided for preventing the back from swivelling to an inclined position, when the tray is in operating position.

Document EP-A-0 112 170 describes a vehicle seat, with a tray which can be quickly disassembled without any tools. Swivelling pins are located in openings of the plate lugs, which can be bent towards each other for disassembling purposes. A torsion tube to be installed on a lug, comprises a block stressed by a spring ad a connection slit. Connection means are used to immobilize the back when the tray is in operating position.

Document EP-A-0 385 861 describes a convertible seat with a retractable tray.

Document EP-A-0 628 447 describes an articulation device for aircraft seat, intended to enable its back to be tilted up. A bearing neck rigidly associated with the back is projected outside along the tilting-up axis. Means associate the bearing neck in a movable and secured way on a substantial part of the axis segment to allow rotation. The illustrated bearing neck, its support and the means for associating the two form a one-piece part.

The known techniques have some disadvantages.

In the case of articulation devices with multiple parts, the times required for assembling and often mounting and dismounting the device are long.

Notably, the devices currently used require an inconvenient step assembling in the transverse direction of a guiding axis of the back which is in a fixed housing with respect to the underframe, on both sides of the rotation axis.

This has a negative influence in that it lengthens the idle time of aircrafts and therefore reduces their cost effectiveness.

In the case of an articulation device with a one-piece bearing neck, the production cost of such a part with multiple functions is high due to its complicated structure.

In addition, the seats are intensively used. Therefore, repeated handling of the back and tray articulations, cause wear which can result in loosening, or malfunctioning. Finally, it is known that the seats of the aircraft's must meet drastic conditions of safety, lightness, space required and resistance.

Thus, the blocking means of the back when the tray is in operating position are relatively heavy and voluminous which is undesirable.

The objective of the invention is notably to remedy these disadvantages. It proposes an articulation device for seats:

- comprising a limited number of constitutive parts, each having the simplest structure possible;
- with a limited space required, notably transversally, and weight, with respect to the known devices
- allowing the rapid assembling/disassembling of the back and tray without tools, as the case may be;
- able to at least limit, or cancel the negative effects of the wear of parts; and
- substantially bringing closer the control connecting rod and control unit of the base plate so that no additional stiffener is required.

To do so, the invention relates to an articulation device intended for the seat structure of a vehicle transporting passengers by air.

This device is intended to allow a back seat structure to tip with respect to the corresponding fixed structure of the seat, and also, optionally the tray to be swivelled around a transverse axis of rotation.

In combination, this device comprises at least

- a transverse bush, essentially extended substantially along the axis of rotation, with, transversally:
  - on the one hand means to hold the back seat structure; and
  - on the other hand, a protuberant head intended to be housed in a complementary element of the fixed structure substantially along an elevation direction, with, following this direction, at least one guiding and backlash elimination lower zone and sensibly opposite, in elevation, to the guiding zone, an upper stress zone for backlash elimination, able to be pushed against the complementary element of the fixed structure by elastic or similar clamping means.

In addition, the complementary element comprises a housing and elastic or similar clamping means with backlash elimination, provided to push the guiding and stressing zones of the bush head against at least two supporting lower zones of the housing, these opposed support zones sensibly defining a <<V >> shape perpendicular to the transverse direction, flared from bottom to top, respectively forward and backward.

According to another characteristic, the device comprises an element for transmitting the tipping control of the back seat structure mounted on the bush substantially coaxial to the axis of rotation; and coupling means, intended to make the back seat structure and transmission element solid in rotation.

These means comprise a rotating lever mounted on the bush substantially coaxial to the axis of rotation, with a first upper arm intended to be rigidly fastened to the back seat structure, radially distant from the axis of rotation, while the other arm called second lower arm is intended to be rigidly fastened, radially distant from the axis of rotation, to the element of transmission.

While in many cases, means for assembling a service tray are mounted to be rotated around the bush, and arranged between the head and holding means of the back seat structure, for instance between an element of transmission and a connecting rod of coupling means.

For example, means for assembling the tray are mounted on a grooved wheel, made of synthetic material and installed idle on an external surface of the bush and/or coupling means are guided on a metal tube rigidly fastened to the bush, by riveting or similar means, for example intended to link with another articulation device.

In an embodiment, at least one friction liner which guides the coupling means essentially comprises a transverse metal tube intended to be part of the back seat structure and /or comprises a shoulder, such as a free end, transversally free, which forms a transverse positioning stop within the articulation device.

For example, at least one lug of the holding means of the back seat structure, generally made of sheet metal and fitted with a hole through perpendicular to the axis of rotation, is rigidly fastened on a transverse metal tube which forms a friction liner, by welding or similar means, substantially perpendicular to the axis of rotation.

In an embodiment, the complementary element comprises a part which forms a cover, for example made of buckled sheet, which has a <<C >> shaped section in a transverse plane of elevation with a concavity oriented towards the back seat structure, this concavity defining a space for mounting a elastically deformable part of the clamping means, both parts being intended to be positioned and rigidly and jointly fastened by a common means of assembly, such as transverse screws, on an internal face of the fixed structure.

According to an embodiment, in a longitudinal plane of elevation, the elastically deformable part, for example as a spring blade, is omega-shaped with an upward concavity, this concavity internally defining the support zones near the omega stroke, while near the end of each branch of the omega, the deformable part defines the clamping means stressing the upper zones of the head.

In another embodiment, the element comprises a rigid plate for transversally spacing, intended to be directly fastened onto the seat structure, a rigid mask forming a transverse stop, fitted with resting areas of the V-shaped housing and mounted on the bracket, as well as stressing and closing means of the housing, separate from the bracket and mask.

An embodiment provides for the stressing and closing means to be combined

For example, they are spring blade-shaped generally longitudinally extended, with a pivoting convolution at one end in a hollow space complementary to the spacing bracket, an elastic median part of pressure on the head forming the means of elastic clamping, and an anchoring convolution by elastic stapling on a complementary protruding finger of the spacing bracket at the opposite end.

Still another embodiment provides partly separate stressing and closing means.

These means comprise a stressing element which is elastically deformable such as a spring rod or kickover spring and a resting pivoting closing shutter, rotating around a transverse axis on the rigid mask and able to surround and stress the bush head, due to the stressing deformable element.

A second objective of the invention is a seat structure of public transportation aircraft, notably of an air carrier, fitted with at least one of such an articulation device.

For example, the seat structure comprises two of these devices, respectively at one of the transverse ends of the axis of rotation, one with, the other without a transmission element.

This seat structure comprises at least one fixed underframe, one fixed base structure and one back structure which can be reclined around the axis of rotation.

The base structure transversally comprises on both sides of the seat structure, two longitudinal crossheads, each of them having a free rear end. The axis of rotation is then horizontal and goes through the base free rear ends and those of the back seat side edges.

In an embodiment, the crosshead comprises an underframe footing, an extension of elevation rigidly fastened on the latter, and the complementary element rigidly fastened on the extension of elevation.

In many seat structures, the structure comprises a device of retractable tray intended to be used by the passenger seated directly behind the structure.

A third objective of the invention is an aircraft seat, equipped with at least one articulation device and/or one of the evoked structures.

And a fourth objective of the invention is a passenger aircraft vehicle, equipped with at least one articulation device and/or a structure and/or a seat as mentioned.

One of the advantages of the invention consists in being able to rapidly assemble and disassemble the underframe back without tools.

Another advantage consists in being able to totally equip a back with its coverings (foam, protective cover) and back tray in a workshop and to exchange an aircraft seat back within a few seconds.

In general, the back must be disassembled to access the bolts for the assembling/disassembling operations.

This results in a reduction in maintenance time and therefore a gain of productivity for the thus equipped aircraft.

One objective of the invention is to obtain a rapid disassembly and a competitive manufacturing cost.

The invention is now described in detail, by reference to the attached drawings given as an example only.

In the drawings,

FIG. 1 is a partial transverse side view, a local cutaway view of an articulation device and seat structure according to the invention, where the aircraft is schematically illustrated.

FIG. 2 is a partial longitudinal side view in perspective and an exploded view, of an articulation device according to the invention.

FIG. 3 is a partial longitudinal side view in perspective and an exploded view, which illustrates the assembly of a according to the invention.

Figure 4:
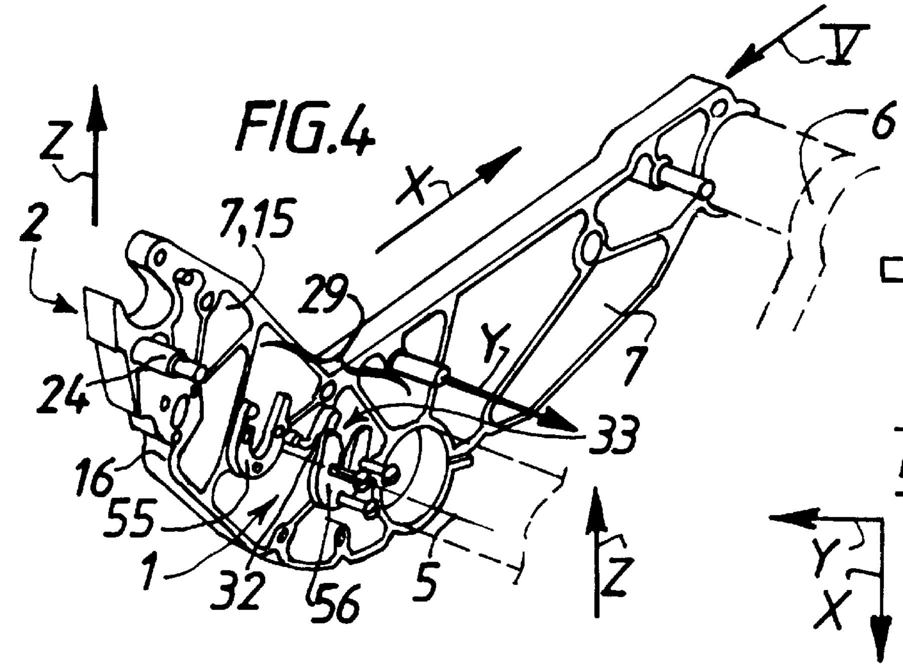
FIG. 4 is a representation in perspective of a one-piece crosshead of a seat structure according to the invention, with some constituents of the articulation device.

Mutually orthogonal directions, x, y, z are represented on the figures.

Direction X called longitudinal, and the direction Y called transverse, are considered to be substantially horizontal. Direction Z called front is considered substantially vertical.

The invention is described here with reference to these directions X, Y, Z.

The constituents of the invention are described in their regular positions and orientations of utilisation. It is obvious that they can have various positions or orientations. This is notably the case of the movable or mobile constituents. Similarly, the storage positions or orientations of the constituents of the invention can be different. These positions and orientations are therefore indicated only as an explanation.

It is pointed out here that the terms <<front >> and <<rear >> are considered according to the longitudinal direction X, which is considered as the main direction of displacement of the vehicle.

The terms <<internal >> and <<external >> are considered according to the transverse direction Y.

While the terms <<lower >> and <<upper >> are considered according to the front direction Z, respectively so as to indicate a lower and upper position.

The terms <<longitudinally >> , <<transversally >> and <<front >> refer to the corresponding directions X, Y and Z.

Reference 1 generally designates an articulation device for a seat structure 2.

This structure 2 is a frame on which the covers such as cushions and accessories for comfort or decoration are installed, to obtain seat 3.

This seat 3 is itself intended to be installed in a transport aircraft 4, schematically represented in FIG. 1. Conventionally, a seat 3 is rigidly fastened on a floor of vehicle 4, through slides not represented.

Structure 2 of seat 3, notably for an air carrier, is fitted with at least one articulation device 1.

In the illustrated embodiments, structure 2 comprises two devices 1, respectively at one of the transverse ends of a axis of rotation 5. In the case of a several-seater 3, two devices 1 are provided for each passenger, in general.

This seat structure 2 comprises at least one fixed underframe 6, a base fixed structure 7, and a back structure 8, reclining on the axis of rotation 5.

Figure 16:
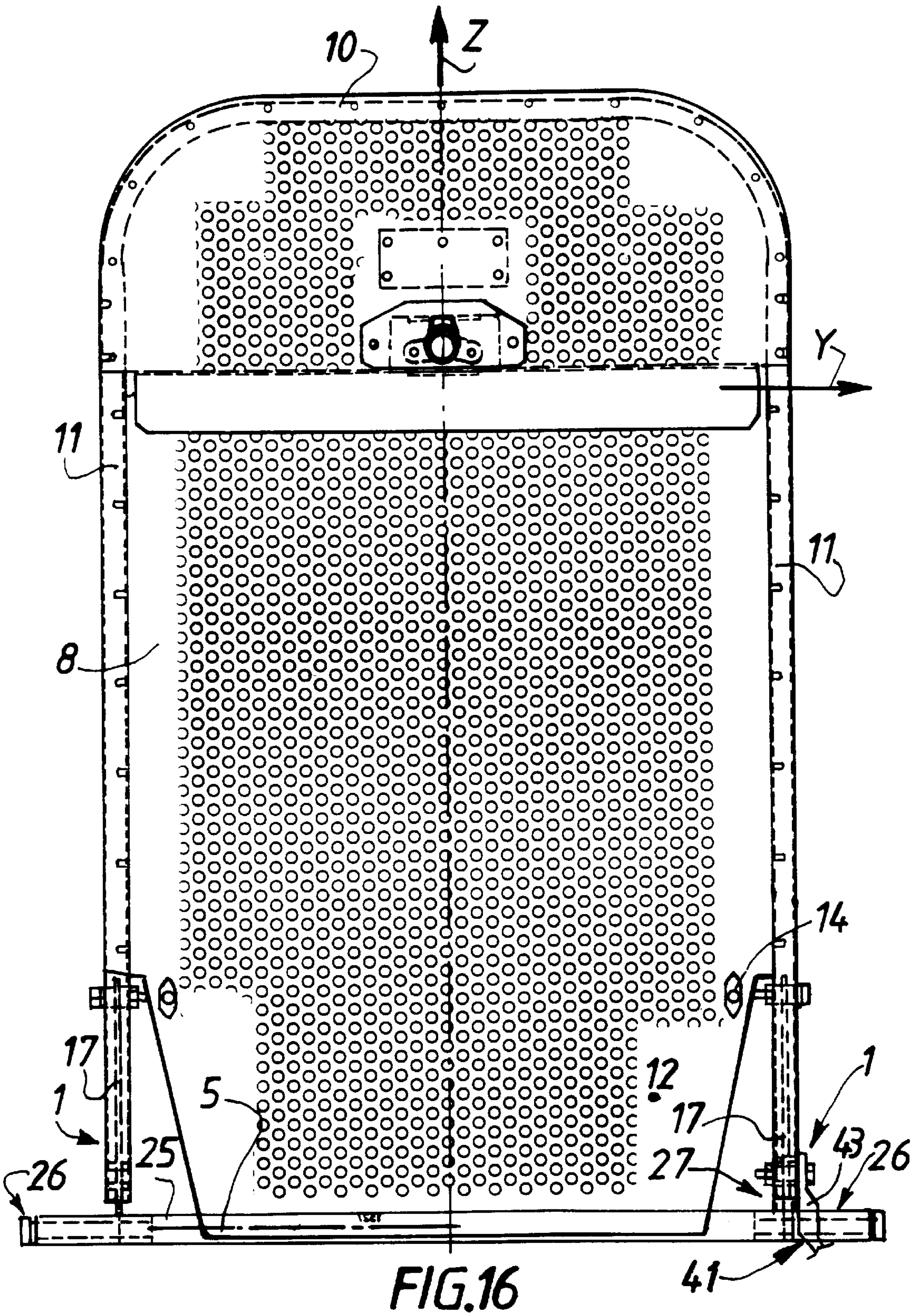
FIG. 16 is a transverse front view of a seat back structure equipped with two articulation devices according to the invention, on the left without coupling means, on the right with such means connected to an element of transmission, this view also representing the means to staple the cover such as the back.

In FIG. 16, structure 2 comprises a general U-shaped frame 9 the transverse core 10 of which forms the back upper part and wings 11 in a front plane form the back side edges.

Figure 17:
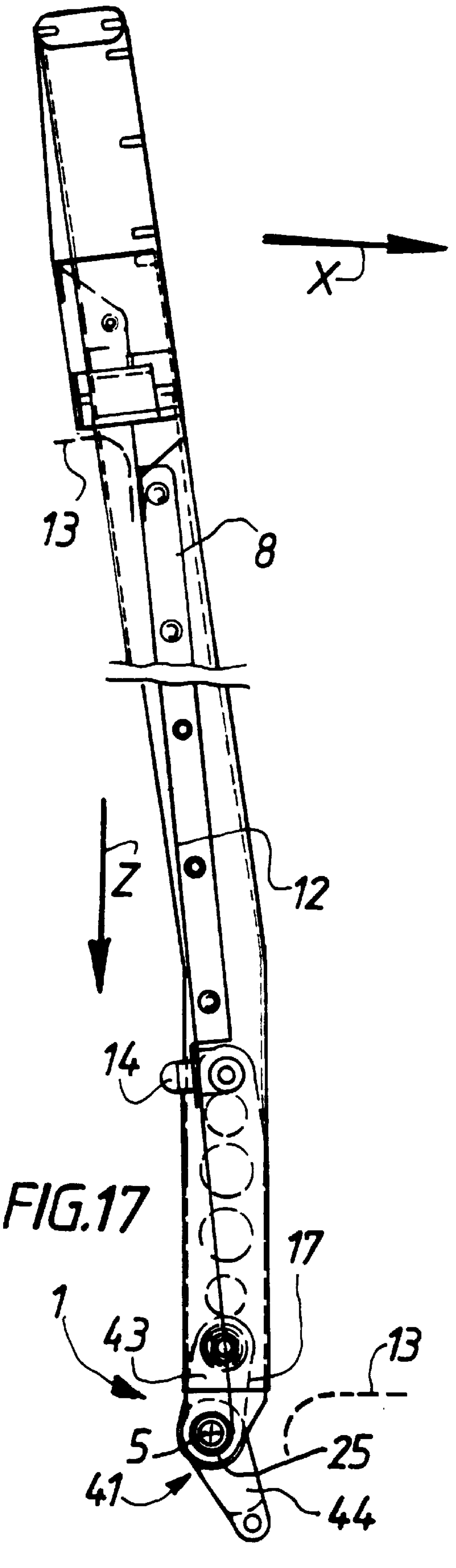
FIG. 17 is a partial longitudinal side view of the structure of FIG. 16, in local cutaway, where a back cover or cushion is schematically represented by a discontinuous line.

A perforated sheet metal 12 is fastened on the frame, to support the covers or cushions 13, visible in FIG. 17. These cushions 13 are assembled on sheet metal 12 by quick fastenings 14.

Base structure 7 also comprises sheet metals 12, cushions 1" and fastenings 14.

Figure 5:
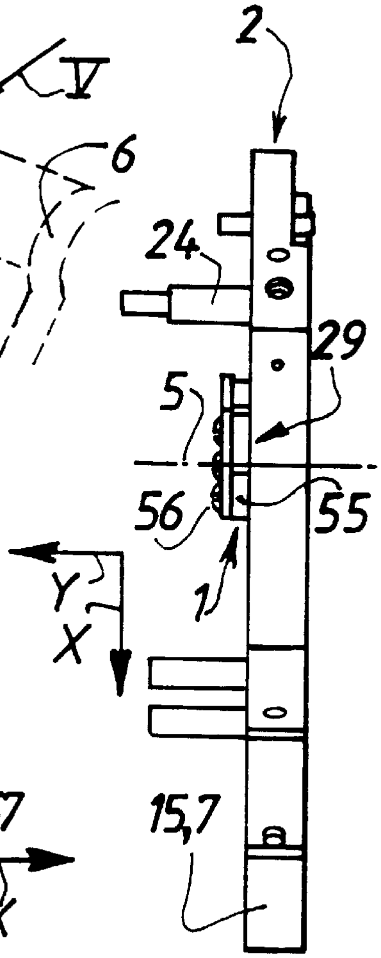
FIG. 5 is a transverse side view along arrow V of FIG. 4.

Transversally it comprises on both sides of seat 3 structure, two longitudinal crossheads 15, each one with a rear free end 16. These crossheads 15 can notably be seen in FIGS. 5, 10 and 11.

Axis of rotation 5 is then horizontal and passes perpendicular to the free rear ends 16 of the base and lower free ends 17 (FIG. 16) of the side edges 11 of back structure 8.

Each articulation device 1 is rigidly associated and solid with at least one free end 17 of the back structure, and here respectively of both, protruding outside and in the prolongation of axis of rotation 5.

Furthermore, each articulation device 1 is mounted in rotation on an internal face of the base structure 7, and more especially here of a crosshead 15.

Figure 11:
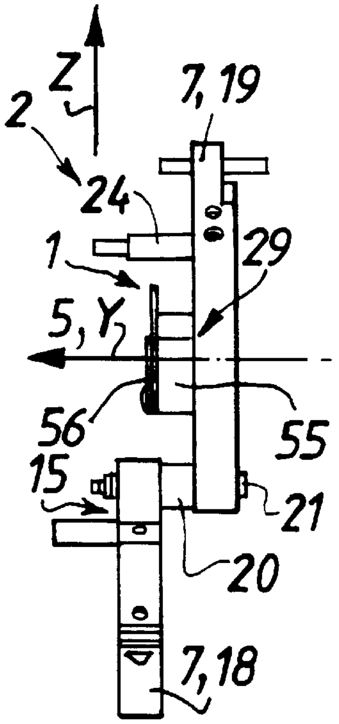
FIG. 11 is a transverse side view of a crosshead comprising the footing, braces and extension of FIG. 10, with a complementary element of articulation device on the inner face of this extension.
Figure 10:
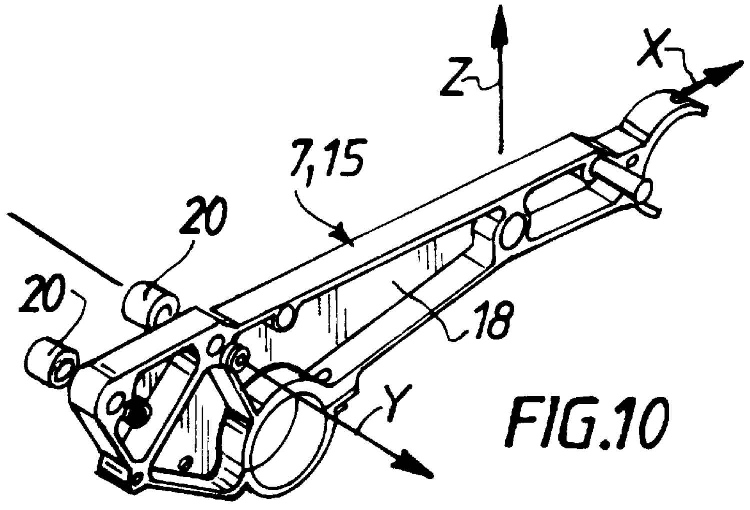
FIG. 10 is a longitudinal side view in perspective of a crosshead footing of a base structure and assembly braces of a crosshead extension, according to an embodiment of the invention.
Figure 12:
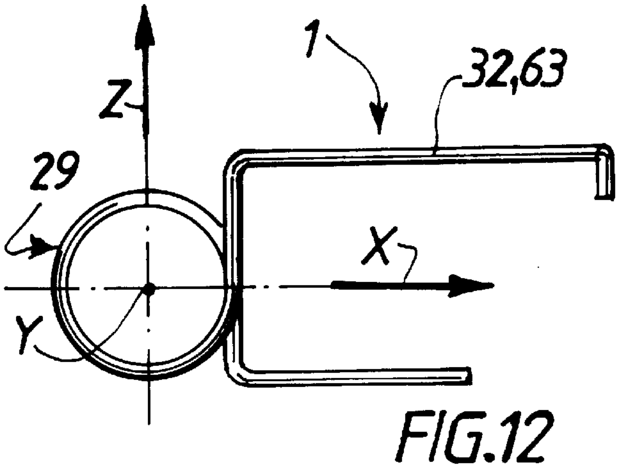
FIG. 12 is a longitudinal side view of a kickover spring of stapling means of an embodiment of the articulation device.
Figure 13:
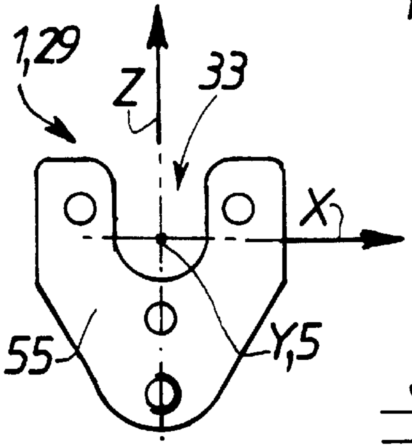
FIG. 13 is a longitudinal front view of a rigid mask of complementary element according to an embodiment of the invention.

In the embodiment of FIGS. 10 and 11, crosshead 15 comprises a base footing 18, and rigidly fastened to this footing, an extension 19 of elevation on which the static part of the device 1 is rigidly fastened.

This enables the use of a same footing 18 or extension 19 for various shapes of structures of seats 2 or base 7.

In FIG. 11, extension 19 is installed transversally outside the footing 18, by means of braces 20 and screws 21. But device 1 is mounted on an internal face of the extension 19.

So the transversal space occupied by the static part of articulation device 1 is compensated, and the access to this device is made easier, for example for assembling/disassembling operations.

Figure 21:
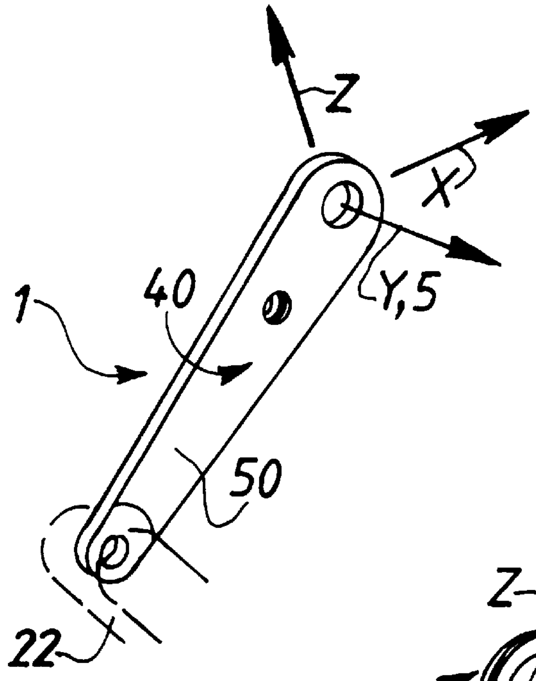
FIG. 21 is a longitudinal side view in perspective of a transmission connecting rod.

In addition, structure 2 comprises an element 22 which controls the inclination and holds the back in position, as schematically illustrated in FIG. 21.

This element 22 is rigidly associated with the base and cooperates via an element of device 1 with the back, to allow the adjusting of its position and to hold it in a position chosen by the occupant of seat 3. Here, one of the devices 1 is equipped with an element of transmission for the control, and the other is not.

In many seat structures 3, structure 2 comprises a device of retractable service trays intended to be used by the passenger seated in the prolongation and behind the structure.

Only a support 23 and a connection 24 of this device of service trays is represented in FIG. 1.

In addition, structure 2, and more particularly the back structure 8, near or at the lower base of the back, comprises a transverse tube 25 linked to ends 17 of the <<U >> of the back frame.

At both external transverse ends this tube 25 receives an articulation device 1 which is rigidly fastened to it by riveting or similar means.

Figure 18:
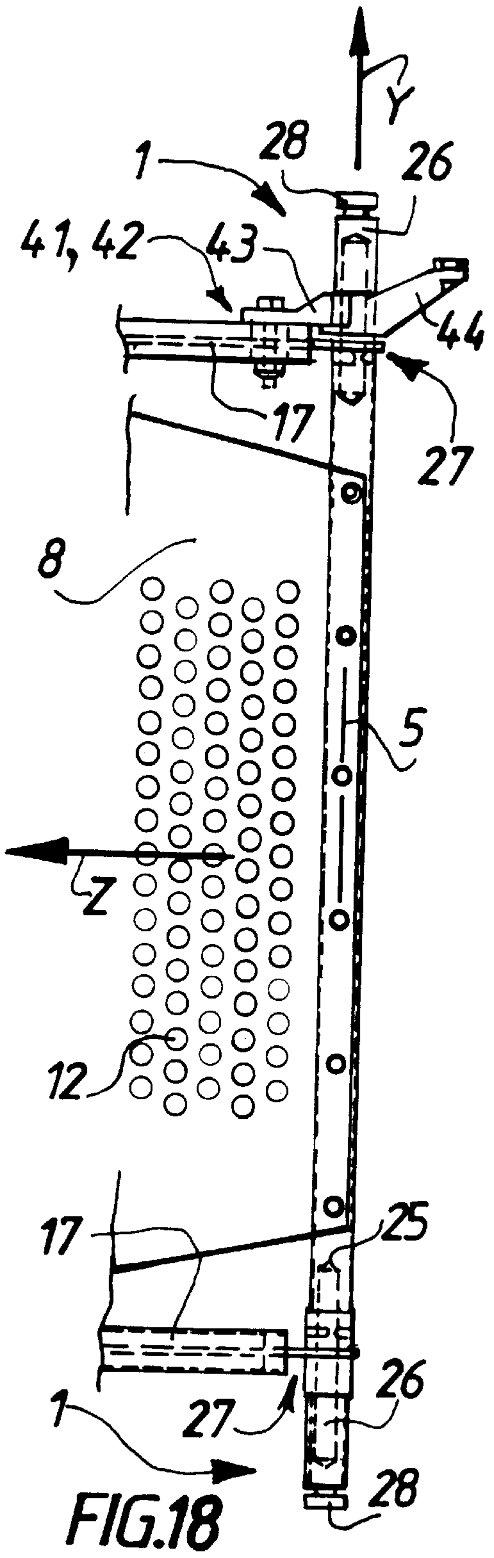
FIG. 18 is a partial plane view of the structure of FIGS. 16 and 17.

Similarly, sheet metal 12 is riveted on tube 25, as it can be seen in FIG. 18.

Also, tube 25 forms at each end a friction liner and/or a fixating support, by welding or similar means, for device 1.

According to an embodiment, this tube 25 defines at each transverse end, a transverse positioning stop for the means of this device 1.

The articulation device 1 intended for structure 2 of a seat 3 of vehicle 4 for passenger air transport will now be described.

Device 1 is intended to allow the tilting of the back structure 8 with respect to a fixed structure, here a base structure 7, corresponding to seat 3.

Eventually this device 1 allows a tray to rotate.

This tilting and pivoting is done around the transverse axis of rotation 5.

In combination, device 1 comprises at least:

one transversal bush 26, essentially extended substantially along the axis of rotation 5, with transversally:

on the one hand, means 37 to hold the back structure 8; and on the other hand, a protruding head 28 intended to be housed in a complementary element 29, intended to be rigidly mounted on the fixed structure 7, substantially along a direction of elevation E.

According to this direction E, head 26 has at least one guiding and backlash elimination lower zone 30.

Substantially opposite in elevation of the guiding zone 30, head 26 comprises an upper stressing backlash elimination zone 31, able to be pushed against complementary element 29, by elastic stapling means 32 or similar, intended to be mounted on fixed structure 7.

In addition, complementary element 29 comprises a housing 33 and backlash elimination elastic stapling means 32 or similar means, provided to push guiding zone 30 and stressing zone 31 of head 28 against at least two lower resting zones 34,35 of the housing.

These opposite resting zones 34, 35 substantially define a <<V >> shape perpendicular to the transverse direction, having a flared shape from the bottom up, respectively to the front and rear.

Thus, when wear occurs, zones 30 of guiding head 28 <<drive into >> the V, while still being perfectly guided and the head is held in the complementary element 29.

Figure 14:
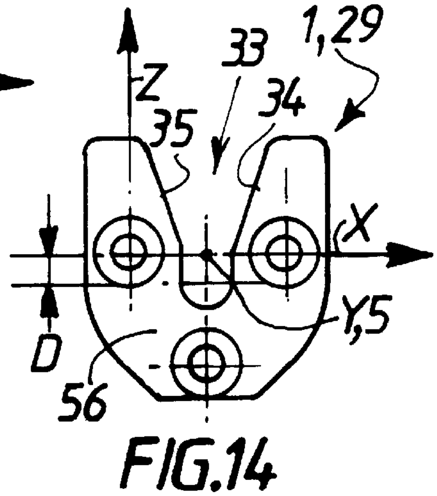
FIG. 14 is a longitudinal front view of a rigid bracket of a complementary element according to an embodiment of the invention.
Figure 15:
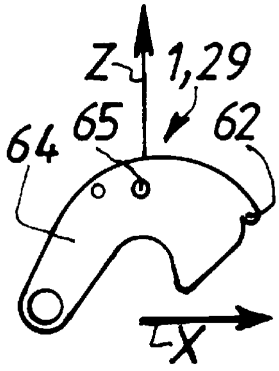
FIG. 15 is a longitudinal front view of a closing and stressing shutter of a complementary element according to an embodiment of the invention.

As can be seen in FIG. 14 where the <<V >> is particularly visible, this driving into results in a slight displacement D of axis 5 as wears occur. Such a displacement is enlarged in this figure, for a better understanding.

Figure 19:
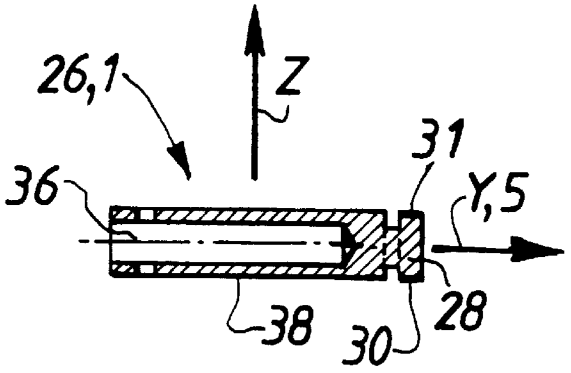
FIG. 19 is a cutaway transverse side view of a head bush made from a machined structural sheet.
Figure 20:
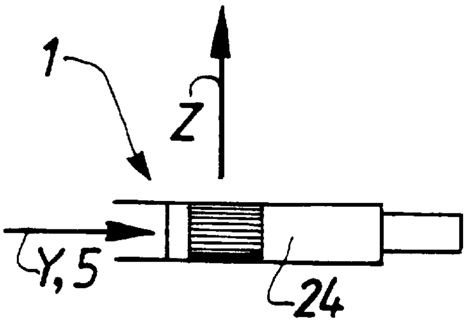
FIG. 20 is a transverse side view of a pin connecting a tray to a back structure.

In FIG. 19, it can be seen that transverse bush 26 is a one-piece part, and essentially made of a portion of cylindrical structural steel, with a circular section perpendicular to axis of rotation 5.

This portion is then machined and/or worked by stamping or similar means. It comprises a transverse dead internal machining 36 and opening opposite to head 28.

The latter is then directly solid with the portion forming bush 26. Here radial drills are provided on bush 26 for the passage of holding means 37, visible in FIGS. 1 and 2.

From FIG. 1 it can be understood that bush 26 comprises at least one external transverse peripheral surface 38 which forms the guiding bearing.

Notably, this surface 38 is obtained by machining such as the turning of the cylindrical full structural steel section, and presents a circular section perpendicular to the axis of rotation 5.

In the example of FIG. 1, bush 26 comprises at least two adjacent surfaces, without discontinuity, with an identical diameter, and which are therefore combined.

It will be seen later that these surfaces are used to guide a transmission element and liner to assemble the tray support.

In addition, the protruding head 28 shows a T-shaped transverse section in the figures.

The transverse foot of this <<T >> is rigidly fastened to a bush body, and here solid with it.

But the <<T >> bar, perpendicular to axis 5 is fitted with backlash elimination guiding and stressing zones 30, 31.

This bar is installed at a free end of bush 26, intended to be located opposite the inside of fixed structure 7.

In these examples, this head 28 has a section, transversally to axis 5 of rotation or tilting, with circular envelopes, in order to give it a general mushroom shape, as can be seen in FIG. 2.

Thus, stressing and guiding zones 31 ensure their functions linked to the positioning in elevation and to the rotation of bush 26, while a surface 39 (FIG. 3) perpendicular to axis 5 of the <<T >> bar, ensures a function of transverse positioning of articulation device 1, in relation to fixed structure 7.

Here, resting zones 30 and stressing zones 31 are part of a same transverse peripheral surface of head 28, with a substantially cylindrical shape coaxial to the axis of rotation 5.

As mentioned above, device 1 comprises a transmission element 40 connected by an articulation of transverse axis to tilting control element 22 of back structure 8.

The transmission element 40 is mounted on bush 26 substantially coaxial to axis of rotation 5.

Device 1 also comprises:

coupling means 41, intended to make back structure 8 and transmission element 40 solid in rotation.

Thus, when a control to change the back inclination is actuated by the occupant of seat 3, it is transmitted to back structure 8 via elements 22 and 40 then means 41.

Here means 41 comprise a lever 42 rotating on bush 26 substantially coaxial to axis of rotation 5.

Lever 42 has a first upper arm 43 intended to be rigidly fastened to structure 8, by fastening means, here a transverse screw together with its nut.

This fixation is arranged radially distant from axis of rotation 5.

The other arm 44, called second lower arm, is intended to be rigidly fastened, radially distant from axis of rotation 5, to transmission element 40. This fixation is here a transverse screw mounted in a female thread of arm 44.

Since coupling means 41 and transmission element 40 are coaxial and close to the centre of device 1, the operating couples are limited, to obtain a light and mechanically resistant articulation.

In the case of the figures, mounting means 45 of a pull-out flat are installed around bush 26. These means comprise tray support 23.

Mounting means 45 are transversally located between head 28 and holding means 37 of the back structure, more precisely between transmission element 40 and lever or connecting rod 42 of coupling means 41.

It is already understood that when holding means 37 and mounting means 45 are installed around bush 26, it is no longer required to provide an additional structure to adjust the position of the pulled out tray depending on the position of back structure 8.

Indeed, the back can be then tilted around the common axis of rotation 5, without modifying the tray position. To some extent the back function is eliminated.

In the drawings, coupling means 41 and mounting means 45 of the tray are mounted on the axis of rotation 5, by means of friction liners, installed on the external surface 38 of bush 26.

Figure 8:
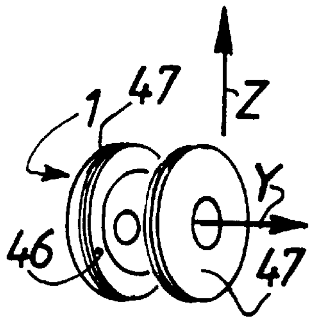
FIG. 8 is a schematic view in perspective of a guiding liner of the back edge, a device according to the invention.
Figure 7:
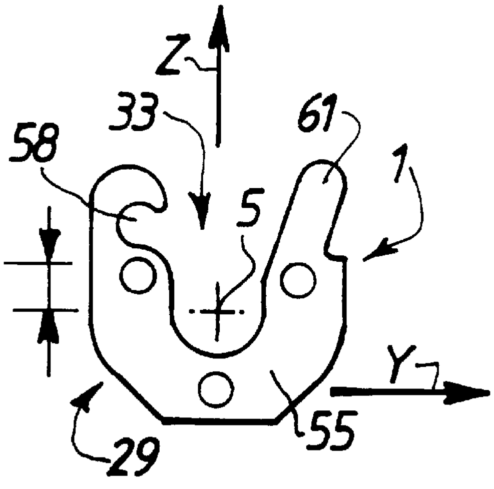
FIG. 7 is a longitudinal side view of a rigid bracket for housing the device according to the invention.
Figure 23:
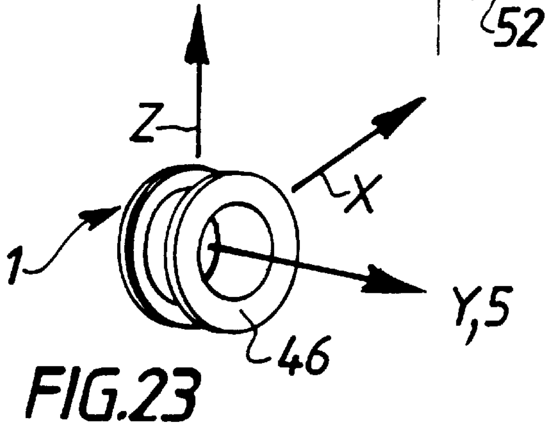
FIG. 23 is a view of a synthetic liner for guiding the rotation of a tray support.

A liner 46 of mounting means 45 of the tray, is a wheel. In FIG. 8 or 23 it can be seen that wheel 46 has a groove, made of synthetic material and located idle on an external surface 38.

Another liner is metal tube 25, and is part of holding means 37. The liner external surface formed by tube 25 is used to guide lever 42 of coupling means 41 in rotation. This metal tube 25 is rigidly fastened to the bush, by riveting or similar, and is moreover intended for the connection with another articulation device 1.

In the illustrated embodiments, friction liners 25, 46 comprise at least one shoulder, respectively 47, 48 such as a transversally external free end, which forms a transverse positioning limit within articulation device 1.

In fact, wheel 46 has two transversal shoulders on both sides, the external one being a stop for element 40 and the other one being internal for lever 42.

External shoulder 48 of the tube which forms liner 25 is used as a stop for wheel 46, and thus defines the transverse position of its internal shoulder against which lever 42 abuts.

FIGS. 1 and 2 show that a lug 49 of holding means 37 of back structure 8 is generally made of sheet metal. It is fitted with a through-hole perpendicular to axis of rotation 5, through which the screw fastening arm 43 to structure 8 goes.

Lug 49 is rigidly fastened to metal transverse tube 25 which forms a friction liner, by welding or similar means, substantially perpendicular to axis of rotation 5.

In addition to the already mentioned means of rigid fixation to bush 26 substantially coaxial, to connection tube 25, holding means 37 comprise other means substantially in a plane perpendicular to axis of rotation 5, linking bush 26 to a frame of back structure 8. These are lug 49 and its welding on tube 25.

It is thus understood that holding means 37 and coupling means 41 are at least partly combined.

More precisely, holding means 37 comprise lug 49 rigidly fastened to bush 26 and intended to be fastened to structure 8, while coupling means 41 comprise the first upper arm 43 of lever 42 to which structure 8 will be rigidly screwed.

Thus, upper arm 43 participates in the mechanical resistance of holding back structure 8. An excellent rigidity is thus obtained while limiting the weight and space of the device.

In addition, transmission element 40 controlling the tilting, essentially comprises a connecting rod (FIG. 21) mounted idle in rotation on bush 26, having a free end radially distant from tilting axis 5, and which will be rigidly fastened to the second lower arm 44 of the lever of the coupling means 41.

Here, connecting rod 40 is obtained from a flat metal sheet or the like, and has an internal face substantially perpendicular to tilting axis 5 and which forms a positioning transverse stop for coupling means 41 via wheel 46 of mounting means 45 of the tray.

The various face 50 or shoulders 47, 48, used as stops, form a chain of dimensions which simply and inexpensively ensure a relative and accurate transverse positioning of the main constituents of device 1.

Indeed, the tray coupling means and mounting means and the transmission element transversally abut two by two, from the inside to the outside of articulation device 1.

Here the advantages of a one-piece bearing neck, notably without the pecuniary disadvantages, are observed.

Figure 9:
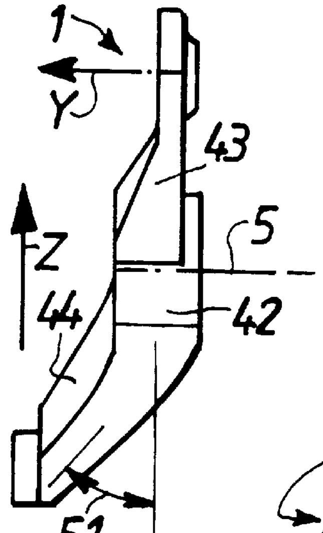
FIG. 9 is a transverse side view of a connecting lever of the articulation device.
Figure 22:
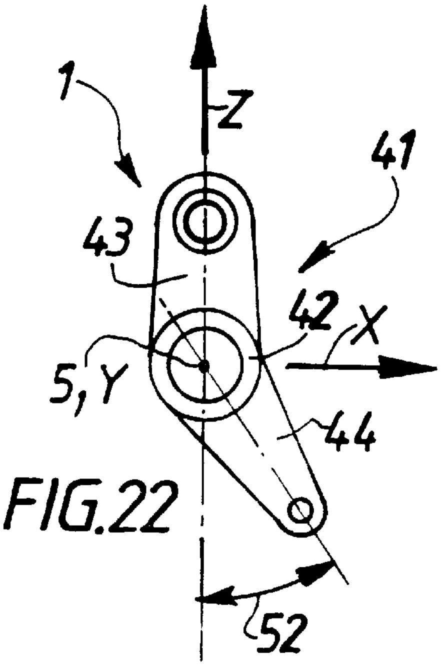
FIG. 22 is a longitudinal side view of a coupling lever.

In FIGS. 1, 9 and 22, it is seen that the first arm 43 of the coupling means, generally extends along a direction perpendicular to tilting axis 5, notably along a direction of elevation, from bottom up.

While the second arm 44 generally extends with respect to a plane perpendicular to tilting axis 5, from top to bottom transversally from the inside to the outside of articulation device 1, according to an angle 51 included between 20° and 60° and notably about 40°.

It is then possible to organize a space for releasing tray support 23 outwards, for disassembling purposes.

Second arm 44 also generally extends with respect to a plane parallel on the one hand to tilting axis 25 and on the other hand to the direction of elevation Z, longitudinally from top to bottom from the rear to the front of articulation device 1 according to an angle 52 included between 20° and 60°, and notably about 40°.

A rigid coupling without intermediate part can thus be obtained by decreasing the distance between this arm 44 and control element 22.

These angles 51, 52 are also used to reduce the space of articulation device 1, along longitudinal directions L and transverse directions T, respectively.

In the embodiment of FIG. 3, complementary element 29 comprises a piece which forms a cover 53 made of buckled sheet, which has a section in a transverse C-shaped plane of elevation with a concavity turned towards fixed structure 7.

This concavity defines a space for mounting an elastically deformable part 54 of stapling means 32.

Both parts 53, 54 will be positioned and rigidly fastened together by common mounting means on an internal face of fixed structure 7, such as transverse screws.

Obviously this fixation authorizes the deformations required for the stapling and backlash elimination function ensured by part 54.

According to this embodiment, elastically deformable part 54, here in spring blade, is omega-shaped with a concavity turned upwards in a longitudinal plane of elevation. This concavity internally defines resting zones near the omega stroke. while near the end of each branch of the omega, the deformable part defines stapling means stressing the upper zones of head 28.

Here, the omega stroke defines the backlash elimination <<V >> with zones 34, 35.

Three hooks to assemble the elastically deformable part 54 are formed by the open omega convolutions.

One of them is a central hook which protrudes in elevation towards the bottom in the middle of the stroke and longitudinally from each base of the omega, so that each one allows the passage of a transverse mounting screw. Corresponding holes will be drilled to allow these screws to go into cover 53.

In the embodiment of FIGS. 4 to 15, the complementary element 29 comprises a transverse spacing rigid bracket 55. This bracket 55 is directly fastened to fixed structure 7 of the seat.

A rigid mask 56 used as a transverse stop, is fitted with resting zones 34, 35 of the V-shaped housing and mounted on bracket 55.

Stressing and closing means of housing 33 are here distinct from bracket 55 and mask 56.

In the embodiment of FIGS. 4 to 7, the stressing and closing means of the housing are combined.

These are stapling means 32.

Figure 6:
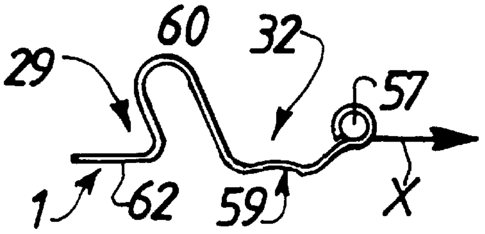
FIG. 6 is a longitudinal side view of an elastic holding element of the device of the invention.

These means 32, as in FIG. 6, have the shape of a spring blade generally longitudinally extended, with at one end a pivoting convolution 57 in a hollow space 58 additional to spacing bracket 55.

A pressure elastic median part 59 on head 28 forms the elastic stapling means 32 proper.

Another anchoring convolution 60 allows the elastic spring stapling on a complementary protruding finger 61 of spacing bracket 55, at the opposed end.

A tongue 62 is noticed to catch the spring, which allows convolution 60 disengagement out of finger 61, to release bush 26 when convolution 57 has pivoted in hollow space 58.

Obviously, this tongue 62 also facilitates the engagement of convolution 60 under pressure on finger 61, when assembling.

In another embodiment of FIGS. 11 to 15, the stressing and closing means are partly separate.

These means comprise an elastically deformable stressing element 63, which is here a spring or kickover spring, and a closing pivoting shutter 64 for support, pivoting around a transversal axis on rigid mask 56 and able to hold and stress bush head 28, due to stressing deformable element 63.

For this purpose, shutter 64 is fitted with a hole 65 to allow an end of pin 63 to go through. Another end of the spring is housed in a complementary hole of bracket 55 or mask 56.

Shutter 64 also has a handling tongue 62.

Now it can be understood that the characteristics of the invention make it possible to remedy the problems of the known techniques.

In the represented embodiments of the invention, seat back 1 can be installed in four positions, that is:

- the position of association or position of assembly-disassembly where the back is turned down to the base so that the back plane and the horizontal plane form an angle included between 25 to 35°, notably 32.5°;
- a <<break-over >> position, corresponding to a service position in case of accident, the back being turned down forward to the base and forming an angle of approximately 70° with respect to the horizontal plane;
- the seated position, service position where the passenger is seated, which can tipped according to the back inclination chosen by the passenger; and
- the reclining position, service position where the passenger is slightly lying back.

What is claimed is:

1. Apparatus which swivelably mounts a tray table to a seat back of a tiltable aircraft seat comprising:

a) a tube located adjacent to the seat back and oriented transversly with respect to an aircraft;

b) bushes, each having a backlash elimination zone, said bushes being attached coaxially to said tube extending outwardly from opposite ends thereof, said bushes having complementary means for attaching the tube to the seat back, said complementary means including elastic stapling means having an open end for engaging said backlash and elimination zone of said bushes; and c) a tray table pivotably attached to and extending outwardly from said tube.

2. Apparatus according to claim 1, wherein the complementary means comprises a housing and said stapling means said stapling means being properly shaped for gripping the head of a bush said shape being substantially V-shape perpendicular to the transverse direction of the seat, being flared from the bottom up and respectively forward and backward with respect to the aircraft, said elastic stapling means being attached to the seat back such as to engage said bushes and secure the tube transversely with respect to the aircraft.

3. Apparatus according to claim 1, wherein the bushes are each a one-piece part, comprises a cylindrically shaped portion of structural steel, said tube having coaxial holes extending inwardly from each end, said holes being formed by such processes as machineing and stamping, said bushes being sized to fit snugly within the coaxial holes in said tube, and being mounted therewithin, said bushes further having holding means for preventing the bushes from rotating with respect to the tube.

4. Apparatus according to claim 1, wherein said bushes comprise an external peripheral surface which form a guide bearing, being obtained by machining by turning a cylindrical structural steel section, which has a circular section perpendicular to its comprises at least two adjacent surfaces separated by said backlash elimination zone with the adjacent surfaces having an identical diameter.

5. Apparatus according to claim 1, wherein a protruding head and guides said bush has a T-shaped transverse section, the leg of which is rigidly fastened to the bush body, while the "T" bar, fitted with backlash elimination guiding zone and stressing zone is located at a free end of the bush and located opposite to the inside of the head which has a section transversal to the tipping axis with circular envelopes, which gives the head a general mushroom shape.

6. Apparatus according to claim 1, wherein the guiding and stressing zones form a part of the surface of the head having a substantially cylindrical shape which is coaxial to the axis of rotation.

7. Apparatus according to claim 1, wherein said tray is mounted around each bush and located between a head and complementary means of back structure, between the transmission element and the lever of the coupling means.

8. Apparatus according to claim 1, wherein said tray is mounted substantially on the transverse axis of rotation, through at least one friction liner which is in turn mounted on an external surface of bush, and made of such materials as synthetic material and metal.

9. Apparatus according to claim 8, wherein at least one friction liner which guides coupling means is essentially constituted by a transversal metal tube, and wherein a part of the back structure comprises a shoulder which forms a positioning stop transversal within articulation device, having at least one lug of holding means of the back structure, being made of sheet metal and having a through hole which is perpendicular to the axis of rotation, and is rigidly fastened to the transversal metal tube, which forms a friction liner, and is substantially perpendicular to axis of rotation by welding.

10. Apparatus according to claim 1, having holding means for rigidly fastening a bush substantially coaxial to a tube in order to connect the bush to an articulation device which is transversally opposed to the axis of rotation, and substantially in a plane which is perpendicular to the axis of rotation (5), and to the frame of the back seat.

11. Apparatus according to claim 1, having holding means comprising a lug which is rigidly fastened to bush and also to the back seat structure, and having coupling means which comprises a first upper lever arm with back (8) structure being rigidly fastened thereto, by screwing.

12. Apparatus according to claim 1, wherein the transmission element of the tilting control, comprises a connecting rod mounted idle in rotation on bush with one end being radially distant from the tilting axis, and rigidly fastened to the second lower lever arm of the coupling means, with the connecting rod being formed from a flat piece of sheet metal, and has a face which is substantially perpendicular to the axis, which forms a positioning transversal stop, for coupling means and the mounting means of the tray.

13. Apparatus according to claim 1, wherein the stapling means comprises an elastically deformable part, and a cover made of stamped sheet metal, said deformable part having a transversal C-shaped section in a plane of elevation with a concavity turned toward seat structure, this concavity defining a space for mounting said elastically deformable part of the stapling means, with both being positioned and rigidly fastened together by common mounting means to the internal face of fixed structure, said common mounting means including screws.

14. Apparatus according to claim 1, wherein said stapling means has a rigid bracket transversally oriented directly fastened on fixed structure of the seat, a rigid mask which forms a transversal stop.

15. Apparatus according to claim 14, wherein the stapling means and the housing are combined, having the shape of a spring blade which is longitudinally extended, having at one end a pivoting convolution and a complementary hollow space relative to spacing bracket, having a pressure elastic median part mounted on each head (28) and further having an anchoring convolution formed by the elastic stapling on a protruding finger which complements an opposed bush.

16. Apparatus according to claim 14, wherein the stapling means comprises a deformable element, and further comprises a spring rod, and a closing and supporting pivoting shutter, which pivots around a transversal axis surrounding a protruding head of a bush.

17. Apparatus according to claim 1, comprising two such apparatus both mounted transversal to the same axis of rotation with only one apparatus having a transmission element.

18. Apparatus according to claim 17, wherein the apparatus is attached to a seat comprising at least one fixed underframe, a fixed seat structure and a back structure inclinable around the transverse axis of rotation.

19. Apparatus according to claim 18, wherein the seat structure comprises two longitudinally orientated crossheads oriented transversally on both sides of the seat structure, each crosshead having a rear free end, with the crossheads having a transverse axis of rotation which is also horizontal extending through the rear free ends of the seat structure and the free ends of the back side edges.

20. Apparatus according to claim 17, wherein the back structure comprises a U-shaped frame having a core forming a back top and wings extending downwardly from the back.

21. Apparatus according to claim 17, wherein said apparatus is rigidly connected with at least one free end of the back structure, and has two ends, which protrude outwards therefrom along the transverse axis of rotation having at least one articulation device rotatably mounted through the complementary element (29).

22. Apparatus according to claim 17, wherein base structure has two crossheads, which comprise a base footing, and rigidly fastened to this footing, has an extension in elevation which has complementary element rigidly fastened thereto, on an internal face thereof.

23. Apparatus according to claim 17, further comprising control element which is arranged to hold the back in position, the control element being rigidly attached to the base structure and utilizes with the transmission element to adjust the position and hold the seat in position.

24. Apparatus according to claim 17, comprising a retractable service tray arranged to be used by a passenger seated behind the seat structure.

25. Apparatus wherein an aircraft vehicle is equipped with at least one apparatus according to claim 1.

26. A public air transportation vehicle for passengers, being equipped with at least one apparatus according to claim 1.

27. Apparatus which swivelably mounts a tray table to a seat back of a tiltable aircraft seat comprising:

a) a tube located adjacent to the seat back and oriented transversly with respect to an aircraft;

b) bushes, each having a backlash elimination zone, said bushes being attached coaxially to said tube extending outwardly from opposite ends thereof, said bushes having complementary means for attaching the tube to the seat back, said complementary means including elastic stapling means having an open end for engaging said backlash and elimination zone of said bushes; and c) a tray table pivotably attached to and extending outwardly from said tube; and d) a transmission element pivotably mounted on a bush coaxial to the axis of rotation of the tube having coupling means for rotating said seat back comprising a compound lever pivotably mounted on a bush said compound lever having a first upper arm rigidly fastened to the seat back and a second lower arm.

28. Apparatus according to claim 27, wherein the first lever arm of the coupling means, is rigidly fastened to back structure and generally extends with respect to tilting axis, along an elevation, from the bottom up, while the second arm of the connecting rod is rigidly fastened to the transmission element, and generally extends, with respect to a plane perpendicular to the tilting axis, from the top to the bottom, and from inside outside, and also transversely to the articulation device, having angle between 20° and 60°.

29. Apparatus according to claim 27, wherein the second arm of the connecting rod of the coupling means, generally extends from a plane which is parallel with the tilting axis and to the elevation, extending from the top to the bottom from the rear to the front of the articulation device and longitudinally, at an angle between 20° and 60°.

30. Apparatus according to claim 27, wherein the coupling means, the mounting means for mounting the tray, and the transmission element transversally abut, respectively from the inside to the outside of the articulation device.

31. Apparatus which swivelably mounts a tray table to a seat back of a tiltable aircraft seat comprising:

a) a tube located adjacent to the seat back and oriented transversly with respect to an aircraft;

b) bushes, each having a backlash elimination zone, said bushes being attached coaxially to said tube extending outwardly from opposite ends thereof, said bushes having complementary means for attaching the tube to the seat back, said complementary means including elastic stapling means having an open end for engaging said backlash and elimination zone of said bushes;

c) a tray table pivotably attached to and extending outwardly from said tube;

d) said complementary means including a cover, said cover being made of stamped sheet metal having a transversal C-shaped section in the plane of elevation with a concavity turned towards the seat back, the convacity providing a space for mounting said elastic stapling means, both means being positioned and rigidly fasted by appropriate mounting means to the back seat; and e) said elastic stapling means comprising an elastically deformable omega-shaped spring blade with an upper concavity defining an omega shape, the omega shape terminating in open loops providing end hook means for mounting hooks, said omega shape having a protruding central hook in elevation towards the center of the bottom, with the end hook means extending longitudinally from the center, said end hook means sized to allow the passage of a mounting screw.

* * * * *